Dec. 6, 1938.     W. W. SCHOLZ     2,139,606
KNITTED HOSIERY AND METHOD OF MAKING SAME
Filed Dec. 4, 1936     5 Sheets-Sheet 1
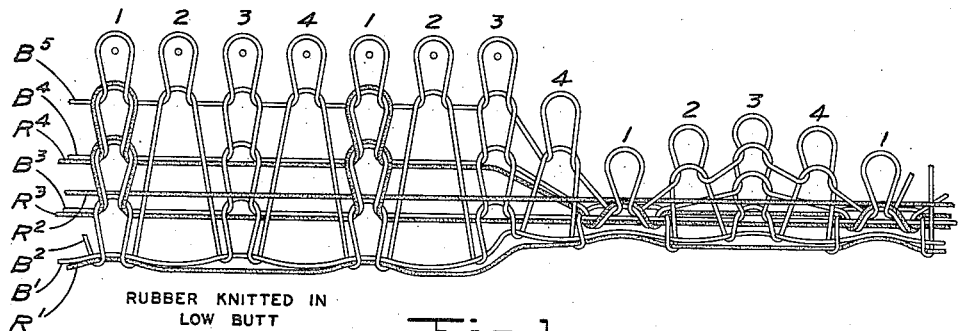
Fig. 1. RUBBER KNITTED IN LOW BUTT
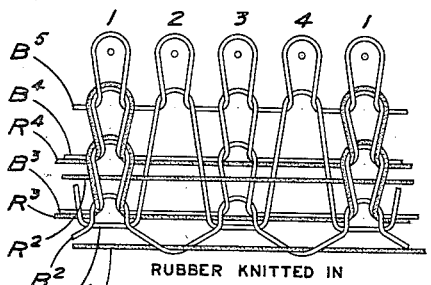
Fig. 2. RUBBER KNITTED IN HIGH BUTT
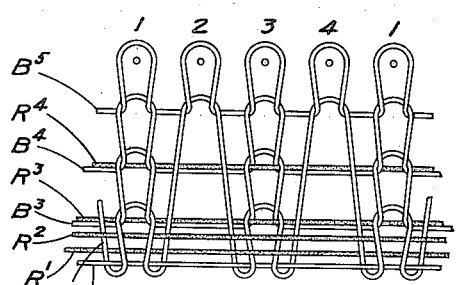
Fig. 3. RUBBER LAID IN LOW BUTT
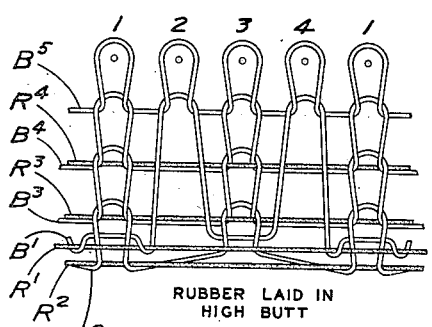
Fig. 4. RUBBER LAID IN HIGH BUTT
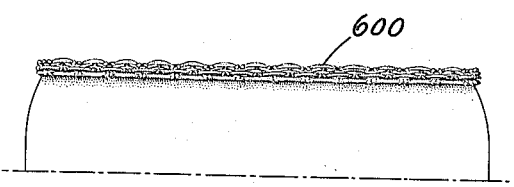
Fig. 16.
INVENTOR
WALTER WILLIAM SCHOLZ
BY HIS ATTORNEYS
Howson and Howson

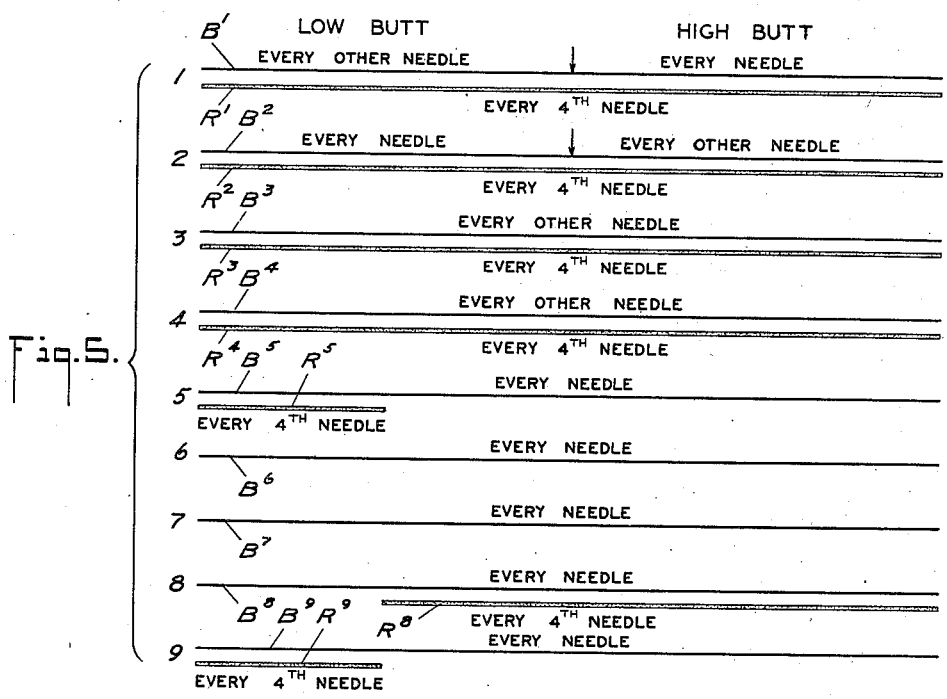
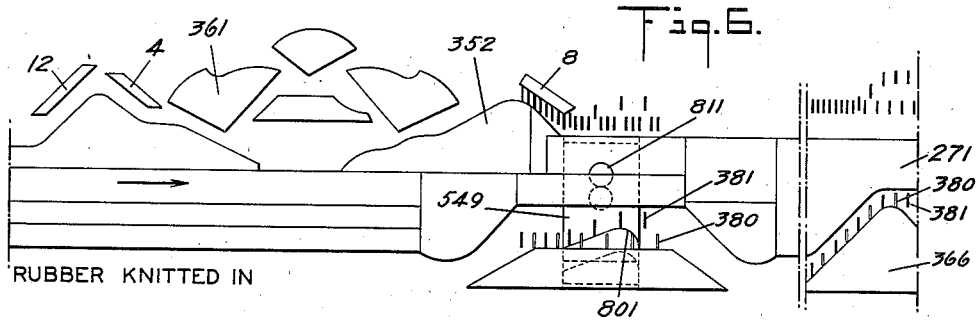
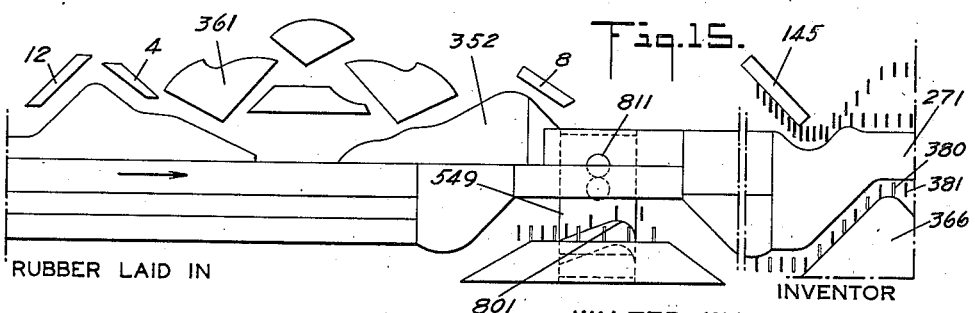

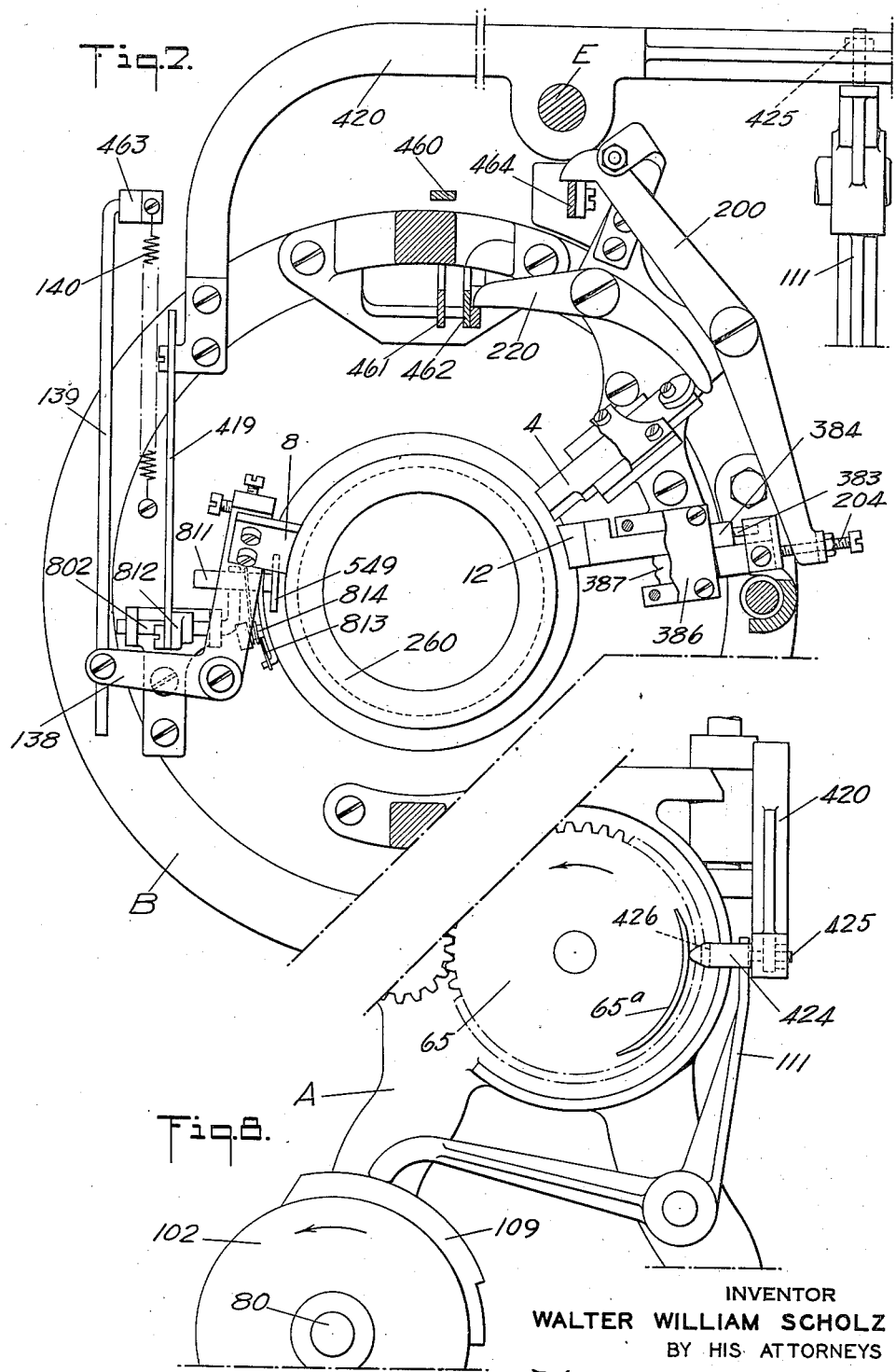

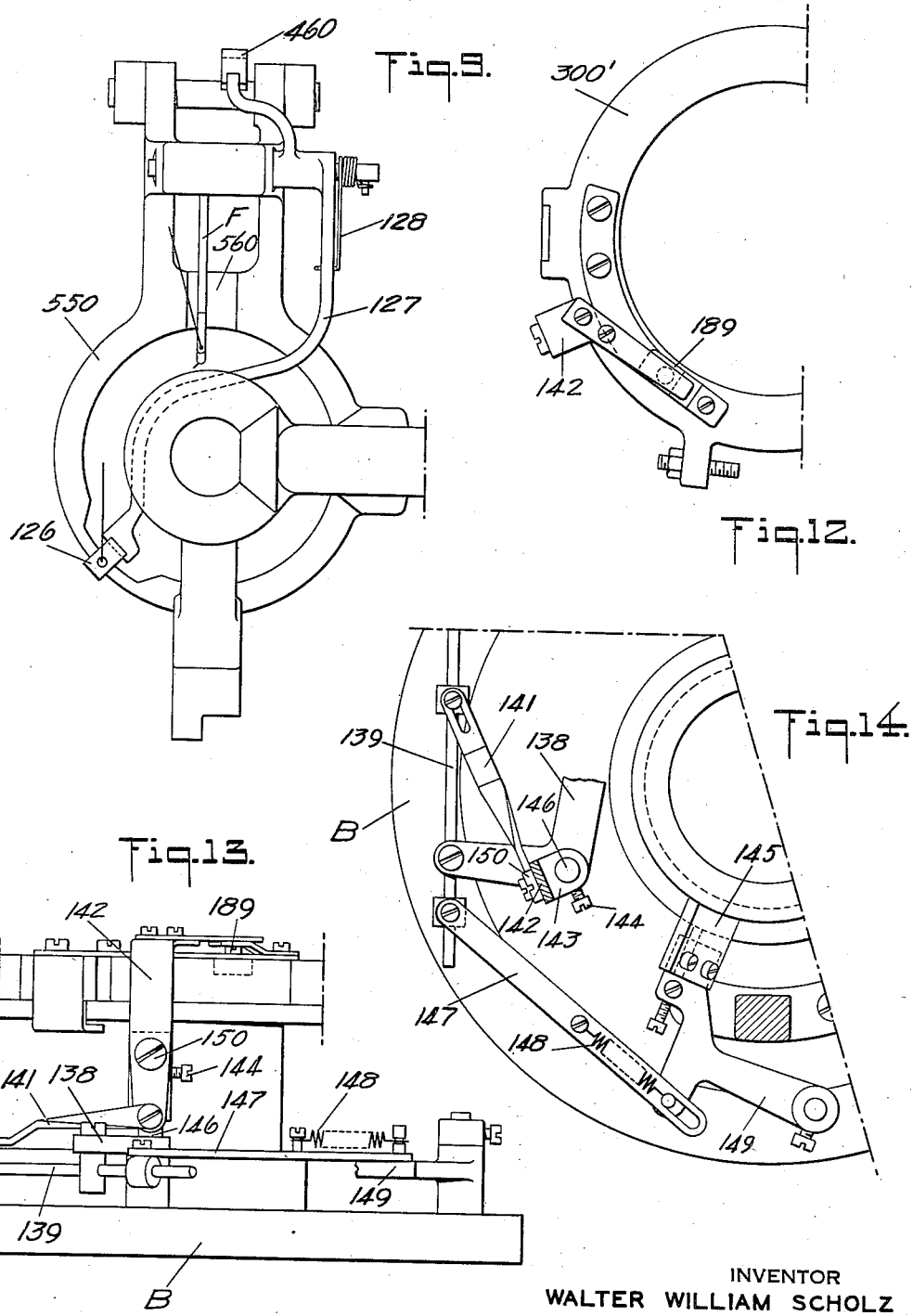

Patented Dec. 6, 1938

2,139,606

UNITED STATES PATENT OFFICE 2,139,606

KNITTED HOSIERY AND METHOD OF MAKING SAME

Walter William Scholz, Woodstock, Ontario, Canada, assignor to Scott & Williams, Incorporated, New York, N. Y., a corporation of Massachusetts Application December 4, 1936, Serial No. 114,275

18 Claims. (Cl. 66—172)

This invention relates to seamless hosiery having a selvage edge top, and method of making same, and more particularly to half hose and anklets having elastic yarn in the tops.

One object of the invention is to produce a non-curling selvage, and it is characteristic of fabric made in accordance with this invention that it has a beading or rib around the selvage of the top in which a plurality of elastic yarns are present.

In the drawings,

Fig. 1 is a diagram of the portion of the first five courses of a fabric made by the low butt needles, in accordance with my invention, Fig. 2 is a diagrammatic view similar to Fig. 1 of the portion of the first five courses of a fabric made by the high butt needles, in accordance with my invention; Figs. 1 and 2 being embodiments in which the elastic yarn is knit in;

Fig. 3 is a diagrammatic view similar to Fig. 1 of fabric made by the low butt needles but in which the elastic yarn is laid in rather than knit in;

Fig. 4 is a diagrammatic view of the portion of the first five courses of the fabric made by the high butt needles, but where the elastic yarn is laid in;

Fig. 5 is a diagram showing to what needles the various yarns are fed in the first nine courses of the fabric;

Fig. 6 is a developed view in elevation of the cam ring of a machine adapted to make fabric where the elastic yarn is knit in;

Fig. 7 is a plan view of the head of a machine adapted to make the novel fabric where the elastic yarn is knit in, the view being taken just above the bedplate and showing the special cams adapted to act on the needle butts;

Fig. 8 is a view taken from the right side of the same machine, showing the mechanism which controls the courses on which the elastic yarn is inserted;

Fig. 9 is a plan view of the latch ring showing the points at which the body yarn and elastic yarn are fed;

Fig. 12 is a plan view of part of the sinker ring of the machine modified to cause the elastic yarn to be laid in, this view showing the cam for retracting the sinkers;

Fig. 13 is a view in elevation of the sinker retracting cam of Fig. 12 and some of the controls for the cam to draw the needles down when the elastic yarn is to be laid in;

Fig. 14 is a plan view of the controls for the cam to draw the needles down after passing the sinker retracting point of Fig. 12, and the controls for the cam which draws all the needles down in order that they may be selected for the feeding of the elastic yarn;

Fig. 15 is a developed view similar to Fig. 6 showing the cam ring of a machine in which the elastic yarn is laid in rather than knit in;

Fig. 16 is a view of the selvage of the top of a stocking showing the novel beading.

Figure 10:
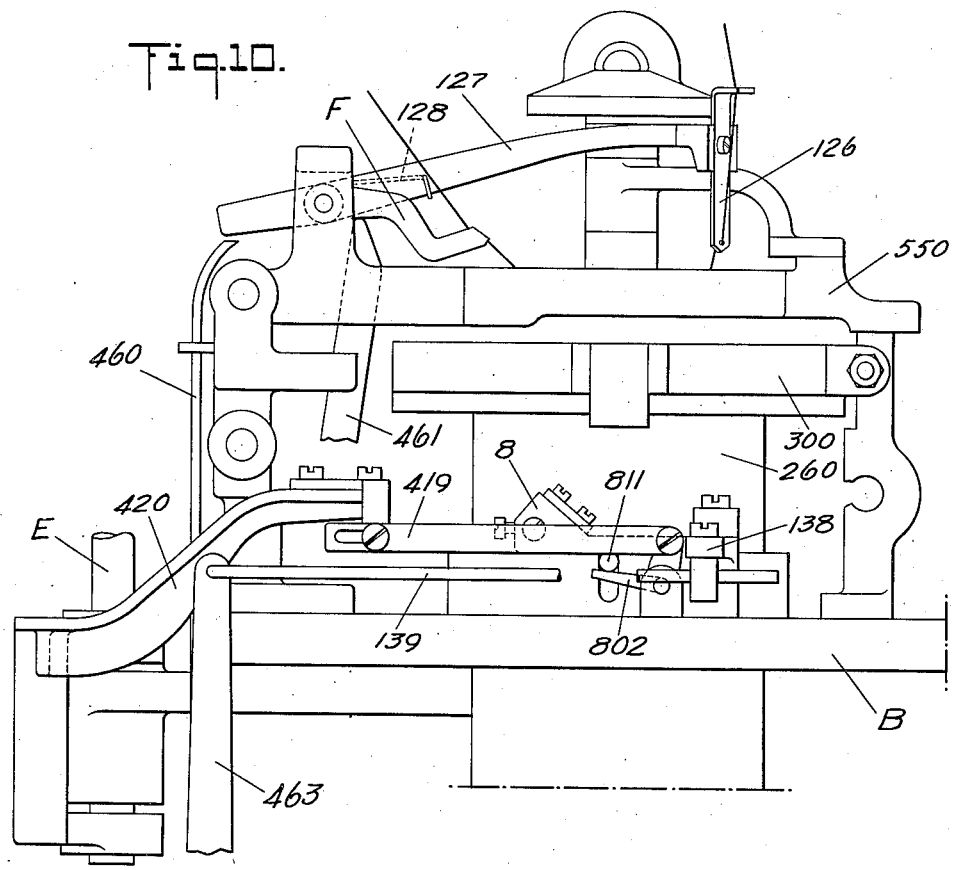
Fig. 10 is a view in elevation from the left side of the machine showing the yarn feeding fingers of Fig. 9 and some of the cams and controls for the jacks and needles at the point where needles are selected for the elastic feeding.

The invention will be shown and described embodied in an anklet, but it should be understood that it can be used in any seamless hosiery where a selvage edge top containing elastic is desired. One of the difficulties with selvages is their tendency to curl outwardly, giving an irregular and undesirable appearance to the stocking or anklet. In the present invention this irregular appearance is avoided by the formation of a uniform beading which gives an attractive and finished appearance to the edge. This is so constructed as to be easy of manufacture and not to hinder the extensibility of the top. The top can be made with the elastic knit in, laid in, or attached in any other desired manner, though in the preferred form it is laid in.

The anti-ravel looping of the selvage is made with inelastic yarns, the anti-ravel yarn itself being used to draw the first few courses together by interlooping bights of this yarn with the yarn of say the fifth course in the fabric. In the courses skipped by the above-mentioned bights of anti-ravel yarn the body yarn is knit in only in spaced wales and is floated in the wales where the bights of anti-ravel yarn lie. The elastic yarn is present in each of the courses skipped by the bights of anti-ravel yarn, and this elastic yarn is preferably attached only at wales spaced further apart than the wales where the body yarn is knit in. Thus in the examples shown in the drawings the body yarn is knit in in alternate wales during these beginning courses, while the elastic yarn is attached at only every fourth wale. This avoids cutting the elastic yarn.

This fabric can be made on a slightly modified form of the model K machine which is shown and described in the patent to Robert W. Scott No. 1,282,958, dated Oct. 29, 1918. The machine has all the usual parts, including the outside sinker ring 300, the needle cylinder 260 and the main pattern drum 120, all of which are found on all Scott & Williams revolving needle cylinder machines based on the original Robert W. Scott patent of this type, No. 1,152,850, dated Sept. 7, 1915. The machine is the same as shown in the said first-mentioned Scott Patent 1,282,958 to the extent that it has jacks underneath the needles, rising over cam 366 at the lower edge of the main cam cylinder 271. In the modified machine there are jacks 380 with short butts and jacks 381 with long butts. As in the case of the machine shown in said patent, there is a jack under every other needle. The short butt jacks are used only for the body yarn during the makeup, while the long butt jacks are also used in connection with the laying or knitting in of elastic yarn.

In the machine shown in the drawings, the jacks 381 with the long butts are used for the selection of needles to take the elastic yarn, and that selection will now be described. As the needles ride up the knitting side cam 352 after the knocking-over point they are all raised to the level at which it is desired to feed the elastic yarn. It is therefore necessary to lower the needles which are not to take the elastic yarn, and in order to accomplish this all the needles are lowered and then the ones which are to take the elastic yarn are raised by the long butt cylinder jacks 381. In order to lower all the needles, a drawdown cam 8 is provided just after the side cam 352. This drawdown cam is mounted on a bell crank lever 138 pivoted on the bedplate B of the machine and is controlled from a cam path on the main pattern drum by a bent lever 463 (see Fig. 11). On this cam path is a drum cam 501 which, when it passes under the lower end of the bent lever 463, causes a wire 139 attached to the other arm of the bell crank lever 138 to be pulled rearwardly, having the effect of inserting this cam 8 into operative position where it can lower all the needles. There is a tension spring 140 between the upper end of the lever 463 and the bedplate B which tends to keep this cam 8 out of operative position. As a result the cam 8 is in its operative position only when the lever 463 is on the drum cam 501.

For the purpose of raising the needles having jacks 381 with long butts so that those needles can take the elastic yarn, a cam 801 mounted on a slide 549 is provided in the cam cylinder at a point just after the needles have passed the drawdown cam 8. This jack raising cam 801 extends radially inward only far enough to catch the long butt jacks 381 and to miss the short butt jacks 380 (see Fig. 6). When the cam 801 is in its raised position shown in Fig. 6, it will elevate the needles having long butt jacks to the position where they can take the elastic yarn, but when the slide 549 is in its lower position the cam 801 has no effect on the jacks.

The movements of the slide 549 are controlled from the so-called high speed gear 65 and the belt shipper drum 102 in a manner which will now be described. The primary control is from the belt shipper drum by means of a peripheral cam 109 thereon, said drum being mounted on the pattern chain shaft 80 and turned therewith, as usual. The pattern chain shaft makes one revolution for every revolution of the pattern chain and therefore is suitable for controlling the times when this cam 801 is to be thrown into and out of operative relation. The connection between the peripheral cam 109 and the jack cam 801 consists of the following parts. Pivoted on the main frame A of the machine is a bell crank lever 111, one arm of which lies in the path of the peripheral cam 109. The other arm of this bell crank lever engages against the lower end of a bent bell crank lever 420 pivoted on the vertical bobbin stand shaft E of the machine. When the lower arm of the bell crank lever 111 rides up onto the peripheral cam 109, the upper end of the bent bell crank lever 420 is moved forward above the bedplate B of the machine. This end of the bell crank lever is connected to a tie rod 419 extending forward to a rocker arm 812 on a bent lever 802. The bent lever is mounted above the bedplate B in a horizontal position and its oscillating end underlies a stud 811 projecting radially from the slide 549. When the bell crank lever 420 is moved by the peripheral cam 109 coming under an arm of the bell crank lever 111, then the tie rod 419 is pushed forward and the lever 802 rocks to raise the pin 811 and the jack cam 801. For the purpose of accurately adjusting these connections there is a set screw 425 in the lower end of the bent bell crank lever 420 and the upper arm of the bell crank lever 111 rests against this set screw.

In making hosiery of the type described, it is desirable that the elastic yarn be omitted from certain courses, and in order to accomplish this the control from the high speed gear 65 is availed of. There is a coiled spring 813 mounted on a screw 814 on the outside of cam cylinder 271 tending to depress the stud 811 and the jack cam 801. Thus when the bell crank lever 111 is on the peripheral cam 109 the stud 811 is held in its raised position, but when the bell crank lever rides off the peripheral cam it drops down onto the periphery of the belt shipper drum 102, and the bent bell crank lever 420 and the tie rod 419 are pushed back by the spring 813 till it lowers the stud 811. It will be noted that the tail end of the peripheral cam 109 is lower than the rest of the cam, and it is when the bell crank lever 111 is on this low end of the peripheral cam that the control of the jack cam 801 is turned over to the high speed gear 65. On the outer side of the high speed gear 65 is a curved cam 65a extending one quarter of the way around the gear. The gear revolves once for every four revolutions of the needle cylinder, and therefore this cam corresponds in length to one revolution of the needle cylinder. Cooperating with this cam is a reading pin 424 projecting forwardly on the lower end of the bent bell crank lever 420. The tip of this reading pin is bevelled to a point and is of such a length that when the bell crank lever 111 rests on the low end of the peripheral cam 109, the tip lies in the path of the cam 65a. When the cam contacts the tip of the pin the bevel on the pin is such as to force it radially outward a short distance until it can ride along the outside of the cam. The adjustments of the parts are such that when the bell crank lever 111 is resting on the low end of the peripheral cam 109 and the reading pin 424 is lying with its nose or end in the path of cam 65a, the stud 811 is in its lowermost position. When, however, the cam 65a pushes the reading pin 424 out of its path, the stud 811 is raised. It will now be obvious that when the control of the stud 811 is turned over to the cam 65a, the jack cam 801 will be in its lowermost position for three revolutions of the needle cylinder and then in its elevated or operative position for one revolution of the needle cylinder, repeating this cycle until the control is taken away from the gear 65. When the bell crank lever 111 rides off the low portion of the peripheral cam 109 down onto the periphery of the belt shipper drum 102, the reading pin 424 is projected well into the path of the cam 65a and the lower side of the reading pin is notched at 426 so that the cam 65a may pass without effect when the reading pin is in this position. The high portion of the peripheral cam 109 corresponds to the beginning of the stocking where the selvage and beading are being made with elastic in every course of the selvage.

Figure 11:
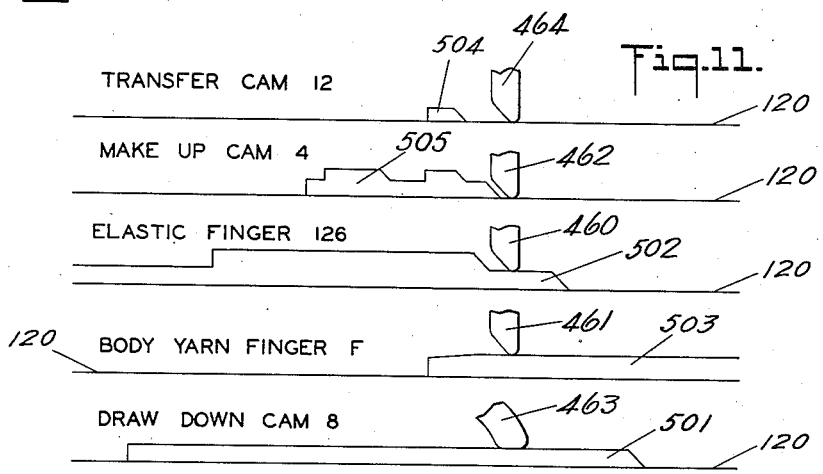
Fig. 11 is a developed view of such cam paths on the main pattern drum as are concerned with the feeding of the body yarn and the elastic yarn and the selection of jacks and needles therefor in the machine of Fig. 7.

The elastic yarn is not fed from the throat plate 560 like the body yarn but is fed from a special finger 126 carried by an arm 127 pivoted on the latch ring 550, the finger 126 extending down through a notch in the latch ring to present the elastic yarn to the needles at the point where the so-called mock seam yarn is frequently fed (see Fig. 9). The arm 127 is normally spring-pressed upwardly by a coiled spring 128 at the pivot point of the arm. It is pushed downwardly to operative position by a thrust rod 460 underlying the rear end of the arm 127, the thrust rod in turn being controlled from a cam path on the main pattern drum, as shown in Fig. 11. The cam 502 underlying the thrust rod 460 is shown as having high and low portions. As can be seen in Fig. 10, when the thrust rod is on the surface of the main pattern drum, it is some distance from the end of the arm 127 and when it is on one of the low portions of the cam 502 it does not move the elastic yarn finger 126. It is only when the thrust rod rises onto the high portion of the cam 502 that the elastic yarn finger 126 is moved downwardly into operative position.

The body yarn is fed from a finger F in the throat plate 560, as usual, and the movements of this yarn finger out of and into operative position are obtained from thrust rod 461 actuated by a cam path on the main pattern drum. Thus in Fig. 11 the thrust rod 461 is shown resting on a cam 503 and while the thrust rod is resting on this cam the yarn finger F will be in its uppermost or inoperative position. When the thrust rod comes off the cam 503 down onto the surface of the main pattern drum, the finger F will be lowered to operative position and will present the yarn to any needles raised to the proper level to take yarn at the throat plate.

As already explained, this invention is concerned more particularly with the manufacture of hosiery where the machine starts up from the bare needles, and in order to make the starting selvage it is preferred that one yarn be presented to every other needle for one circle or revolution of the machine and then another yarn presented to every needle and the first yarn knocked over.

In hosiery made according to the present invention the yarns presented to very other needle and every needle in the first and second courses are inelastic yarns, and means are provided to select needles at the throat plate to get the "makeup". For this purpose there is a makeup cam 4, preceded by an auxiliary raising or transfer cam 12.

At a point on the cam cylinder preceding both these cams is located the usual jack cam 366 which is adapted to raise both the long butt jacks 381 and the short butt jacks 380 so that if there is a jack under every other needle (the successive jacks being alternately long and short butted), every other needle will be raised when the jacks pass the jack cam 366. The butts of the needles therefore approach the cams 12 and 4 at alternate levels, the jackless needles at a lower level than the needles having jacks. Cam 12 is adapted to act as a raising or transfer cam by raising to the level of the jack needles those needles which approach it at the lower level. The movement of this auxiliary raising cam 12 into and out of its operative and inoperative positions is accomplished by the cam path on the main pattern drum by means of a cam 504 acting on a thrust rod 464. The upper end of this thrust rod 464 is bevelled so that its vertical movement will cause a rocking of a pivoted lever 200. One end of this pivoted lever lies against the upper end of the thrust rod and the other end carries a set screw 204 taking against the outer end of a slide 387 in a bracket 386 on the bedplate B of the machine. This slide 387 is spring-pressed radially outward, thus causing it to move outwardly whenever permitted by the thrust rod 464. The outer end of the slide 387 has a shoulder lying in back of another slide 384 which carries the auxiliary raising cam 12. Contact between the slide 384 and the shoulder on the slide 387 is maintained by means of a compression spring and pin 383. It will be observed from Fig. 11 that the drum cam 504 for this auxiliary transfer cam is all the one height, and it might be pointed out that when the thrust rod 464 rides up onto this cam 504, the transfer cam 12 can be inserted half way, i. e., into the path of the high butt needles only. It should be noted at this point that we are discussing the needles and their butts, and not the jacks and their butts. Except when the thrust rod 464 is on the drum cam 504, the transfer cam 12 is out of contact with all the needle butts.

As to the makeup cam 4, the drum cam 505 for the thrust rod 462 controlling the makeup cam has high portions and low portions. When the thrust rod 462 is on a low portion of the drum cam 505 the makeup cam 4 is inserted half way, i. e., in the path of the high butt needles only. When the thrust rod is on a high portion of this drum cam the makeup cam 4 will lie in the path of both high butt and low butt needles. It should be understood, however, that this makeup cam 4 is at such an elevation that needles which have been raised by jacks pass over the top of the cam so that in any case the cam can contact only needles whose butts have not been raised by jacks. Any jackless needle not lowered by the makeup cam 4 will ride over the leading stitch cam 361, be cleared and take the body yarn. The connection from thrust rod 462 to makeup cam 4 consists of a short lever 220 pivoted on the bedplate, one end of which contacts a bevelled surface on the upper end of the thrust rod, and whose other end contacts the outer end of the slide carrying the makeup cam.

The construction of the machine having been described, its operation and timing will now be set forth. The description will begin with the machine having finished one stocking, cast it off, and therefore ready to begin the making of fabric on the bare needles. At the end of the toe of the preceding stocking the main pattern drum 120 is racked around until the bent lever 463 rides up onto the drum cam 501, causing the drawdown cam 8 to be inserted to operative position.

It is desired that the elastic yarn and the body yarn begin at the same needle, and the first needle to receive these yarns is the leading low butt needle. It has a long butt jack 381 thereunder. Since the elastic yarn is being fed at a point well in advance of the throat plate, the introduction of the body yarn is delayed for about half a revolution of the needle cylinder. In Fig. 11 this half revolution corresponds to the linear distance between the beginning of the high portion of drum cam 502 and the end of drum cam 503. The manipulation of needles by the makeup cam 4 and the transfer cam 12 occurs at a point which circumferentially is between the feeding point of the two yarns. This is allowed for in the position of the cam on the main pattern drum 120. Just prior to the time that the elastic yarn finger 126 is lowered into position to feed the elastic yarn to the leading low butt needle, the last of the semi-circle of low butt needles are passing the makeup cam 4.

At this moment the thrust rod 462 rides up onto the first low portion of the drum cam 505, which inserts the makeup cam 4 into the path of the high butt needles. By the time the elastic yarn finger 126 is in its operative position with its thrust rod 460 on the high portion of drum cam 502, the high butt needles have reached the makeup cam 4 and the jackless high butt needles therefore are being directed under the leading stitch cam 361. However, it should be noted that the body yarn has not yet been brought into feeding position, so that there is no yarn reaching any of the needles at the throat plate. While the high butt needles are passing the makeup cam 4 and the transfer cam 12, the continuation of the first makeup rack brings the thrust rod 462 on the first high portion of the drum cam 505, thereby causing the makeup cam to be inserted all the way, i. e., into the paths of both the high butt and the low butt needles. Simultaneously the thrust rod 464 rides up onto the drum cam 504 and the transfer cam 12 is inserted into the path of the high butt needles. The separation of needles continues into the low butt needles and by the time the first low butt needle has reached the throat plate the thrust rod 461 has ridden off the end of drum cam 503 and the body yarn has begun to feed to the leading short butt needle having a long butt jack thereunder. (This is the first needle that received yarn from the elastic yarn finger 126.) This occurs at the end of the first makeup rack of the pattern drum.

When the high butt needles pass the transfer cam 12 for the second time, the cam raises the jackless long butt needles so that all long butt needles take the body yarn. While the high butt needles are passing for the second time, the makeup cam thrust rod 462 rides off the first high portion of the jack cam 505 onto the second low portion of that cam, thus moving the makeup cam 4 out of the path of the low butt needles. Simultaneously, or a fraction of a second thereafter, the transfer cam thrust rod 464 rides off the drum cam 504 and the transfer cam 12 is retracted out of contact with all the needles. This occurs before the low butt needles have finished passing the two cams for the second time. Thus on the second passage of low butt needles the jackless needles are not contacted by the makeup cam 4 and are cleared over the top of the leading stitch cam 361 so that every low butt needle will get the body yarn. This second passage of the high butts is actually the second half of the first revolution during which yarns are fed to the needles. During the first half of the second revolution the makeup cam 4 is not in the path of the low butt needles and therefore every low butt needle takes the body yarn.

When the high butt needles begin to pass the makeup cam 4 for the third time, the cam will lower the jackless needles underneath the leading stitch cam and every other high butt needle will miss the body yarn. At this time the last high portion of the drum cam 505 comes under the thrust rod 462 and the first makeup rack of the pattern drum comes to an end. This leaves the makeup cam 4 fully inserted, so that the jackless needles, both high butt and low butt, are directed under the leading stitch cam 361 and will not take the body yarn. This continues through the third and fourth revolutions of feeding of the body yarn, after which another rack of the main pattern drum 120 drops the makeup cam thrust rod 462 onto the short low portion of the drum cam 505, this occurring while the high butt needles are passing the makeup cam. As soon as the low butt needles reach the makeup cam 4 at the beginning of the fifth revolution of feeding of the body yarn, the continuation of the racking of the pattern drum causes the thrust rod 462 to drop down onto the surface of the pattern drum, retracting the makeup cam out of the path of the high butt needles as well as the low. Thereafter the separation caused by the jacks riding over their cam 366 is ineffective because without this makeup cam 4 being in action, the jackless needles go over the top of the leading stitch cam 361 along with the needles having jacks.

While the separation at the drawdown cam 4 and the transfer cam 12 with regard to the body yarn ceases at the end of the fourth revolution of feeding yarn to the needles, the time of taking out the elastic yarn to begin its intermittent insertion is a quarter of a revolution later in the machine shown in the drawings. The machine, of course, can be timed differently if desired. The purpose of removing and inserting the elastic yarn intermittently at this point on the machine is to bring such removal and insertion at the back of the stocking or anklet, which is in the middle of the low butt needles. This new time of removal and insertion of the elastic yarn (compared to its original insertion at the beginning of the stocking) is obtained by carrying the control of the elastic jack cam 801 over to the curved cam 65a. The second main pawl rack which pulled the makeup cam 4 up to its inoperative position also racked the pattern chain shaft 80 so that the bell crank lever 111 passed on to the low end of the peripheral cam 109. This serves to permit the reading pin 424 to move in toward the high speed gear, and the timing of movement is such that the nose of the reading pin immediately contacts the curved cam 65a. This contact causes the elastic jack cam to continue to raise needles to take the elastic yarn, and the reading pin rides off the curved cam 65a half way through the low butt needles in the fifth course, thus stopping the feeding of the elastic yarn. Since the high speed gear turns once for every four revolutions of the needle cylinder, the curved cam 65a is equivalent in length to one revolution, the reading pin is moved radially outward for one revolution out of four, and the elastic jack cam 801 is in its operative position for one revolution out of four. This causes resumption of feeding of the elastic yarn to every fourth needle for one course in four. The location of the curved cam 65a is such that the elastic yarn is absent from the last three quarters of the fifth course, the sixth and seventh courses and the first quarter of the eighth course. The elastic yarn subsequently is fed to the last three-quarters of the eighth, twelfth, sixteenth, etc., revolutions, and the first quarter of the revolutions coming after those mentioned. When the manufacture of the top is complete and it is desired to remove the elastic yarn for the balance of the anklet, the main transfer rack of the main pattern drum takes place. This serves to rack the belt shipper drum 102 until the bell crank lever 111 drops down onto the periphery of the drum, thereby causing the reading pin 424 to be inserted still further across the face of the high speed gear 65 and bring the slot 426 in line with the path of the cam 65a so that thereafter the cam is ineffective to move the reading pin and the elastic jack cam 801. Simultaneously the bent lever 463 rides off the end of drum cam 501, thus causing the drawdown cam 8 to be retracted out of operative relation with the needles and destroying the separation for the feeding of the elastic yarn. At about the same time the thrust rod 460 rides off the end of the high portion of the drum cam 502, raising the elastic yarn finger 126 to its inoperative position, the yarn being cut and clamped in any desired manner. The balance of the knitting of the anklet can take place in any desired manner, the operations thereafter having no special relation to the present invention.

If it is desired to incorporate the elastic yarn in the fabric by laying it in the stitches, rather than knitting it in, it is not necessary to change the construction of the machine except to add two cams to operate on the needle butts (see Figs. 12, 13 and 14). They are cam 189 to retract the sinkers, and cam 145 to pull the needles down while the sinkers are retracted and after the needles have taken the elastic yarn. The object of these two cams is to have the elastic yarn below the latches of the needles by the time the needles reach the knocking-over point. The sinker retracting cam 189 serves to withdraw the sinkers far enough so that when the needles are drawn down by the cam 145, the elastic yarn in the hooks of the needles will be laid on the knocking-over ledges of the sinkers rather than on top of their nebs. Thereafter whenever a needle is cleared by passing above the leading stitch cam 361, the nebs of the sinkers hold the elastic yarn down and it is cleared below the latches and pushed in back of the needles where it is to float.

Both these cams are controlled by the same means which control the drawdown cam 8. They are inserted with the drawdown cam and withdrawn at the same time as that cam. The movements of the wire 139 actuating the bell crank lever 138 for the drawdown cam 8 are transmitted to the sinker retracting cam 189 by a link 141 attached to the wire 139 and a rocker arm 142, one end of which is pivoted to the link 141 and the other end of which overlies the sinker retracting cam. The rocker arm 142 is pivoted on an upright supporting bracket 143 at a point 150 intermediate the ends of the arm. This supporting bracket is carried by a short vertical post 146 on which the bell crank lever 138 is pivoted. The bracket 143 is held from turning about this post 146 by a set screw 144. When the bent lever 463 rides up on the drum cam 501 for the drawdown cam 8, the wire 139 is drawn toward the rear of the machine, the lower end of the rocker arm 142 is also pulled rearwardly and its upper end presses the sinker retracting cam 189 downwardly through the outside sinker ring 300' to operative relation with the butts of the sinkers.

The needle drawdown cam 145 is carried on a rocker arm 149 pivoted on the bedplate B of the machine, and this arm is linked to the forward end of the wire 139 by a link 147. In order that the drawdown cam 145 may be moved into operative position under spring tension, the connection between the link 147 and the arm 149 consists of a slot in the link 149 through which a pin on the bracket extends. There is a tension spring 148 extending between this pin and the link 147 at a point back of the slot in the link (see Fig. 14), this spring tending to pull the cam into its operative position.

The machine and its construction and operation having been set forth, the making of the fabric will now be described. It will be obvious that the entire circle of needles can be manipulated in the manner in which either the high butts or low butts were manipulated in the example given above, or any other desired start-up can be used. If desired, the fabric need not be started up from the bare needles.

As already mentioned, the yarns begin their feeding with the first of the low butt needles and the elastic yarn coming from the finger 126 is laid in the hook of every fourth low butt needle, i. e., the low butt needles which have long butt jacks 381 under them. Shortly thereafter the other three needles are raised and all come to a point above jack cam 366 at the same level. At this point the elastic yarn lies in the hook of one needle and behind the shanks of the next three needles, this alternation covering all the low butt needles. At the jack cam 366 every needle with a jack under it—whether it is a long butt jack 381 or a short butt jack 380—is raised until the butt of the needle is above the top of the makeup cam 4. At this time the makeup cam 4 is fully inserted so that the low butt needles which are not raised by jacks are drawn under the leading stitch cam and do not take the body yarn which is introduced for the first time to the first needle which took the elastic yarn. (The first low butt needle to have a long butt jack is the first one to take both the elastic yarn and the inelastic yarn.) The low butt needles with jacks being at the high level and above the makeup cam 4, are raised to the "clearing" level, and if the elastic yarn were held down at this point it would be cleared below the latches of those needles. However, the elastic yarn is lying on top of the nebs of the sinkers and therefore there is nothing to hold it down and the yarn is not cleared but stays in the hooks of the needles. At the throat plate these needles with jacks receive the body yarn, and as they go down under the regular stitch cam they come into line with the intervening needles that went under the leading stitch cam 361 and the body yarn is interlaced in front of and behind alternate needles instead of in front of one needle and behind every fourth needle, as in the case of the elastic yarn. There being no yarn below the latches of the needles, there are no stitches to be knocked over and no loops to be drawn through other loops.

As the first revolution continues, the high butt needles are drawn down by the cam 8 and pass beyond it. Every fourth high butt needle is raised by its long butt jack 381 and takes the elastic yarn in the same manner as the short butt needles. The high butt needles are separated by the jacks at the jack cam 366 in the same manner as the short butt needles, but at the transfer cam 12 the jackless high butt needles are raised above the makeup cam 4 and all the high butt needles pass over the top of the leading stitch cam 361 and take the body yarn. Therefore, as the high butt needles pass under the regular stitch cam for the first time, the elastic yarn is interlaced in front of one needle and behind three needles while the body yarn lies in the hooks of all the needles. No stitches are drawn through other loops and no stitches knocked over as in the case of the low butt needles.

During the second revolution in which yarn is fed, the manipulation of the yarns and needles is as follows: The elastic yarn is laid in the hook of every fourth needle, both low butt and high butt, and behind the next three needles, as in the previous revolution, but the manipulation of the body yarn is different. While the high butt needles were passing the makeup cam 4 on the first revolution, that cam was retracted half way until out of the path of the short butt needles, so that the second time the short butt needles pass the makeup cam 4 with yarn in their hooks, none of them are drawn down under the stitch cam 361. As a result, all the low butt needles pass over the top of the cam 361 and all take the body yarn. When passing over the top of this leading stitch cam 361, the needles are raised again to the clearing level, and the sinkers having been withdrawn at the knocking-over point on the previous revolution of the machine, both the body yarn $B^1$ and the elastic yarn $R^1$ of the first course are drawn below the latches of the low butt needles. The knocking-over of the interlaced body yarn $B^1$ of the first course results in that yarn straddling the body yarn $B^2$ of the second course and the elastic yarn $R^2$ of the second course, thereby creating an anti-ravel setup. The elastic yarn $R^1$ also straddles the two yarns of the second course on each side of the wale where the elastic yarn $R^1$ was in the hook of the needle.

On the second time that the high butt needles approach the transfer cam 12 and the makeup cam 4 with yarns on them, the transfer cam 12 being out of operative position and the makeup cam 4 being in the path of the high butt needles, only the needles with jacks pass over the top of the leading stitch cam 361 and the jackless high butt needles are drawn under it. The high butt needles with long butt jacks 381 therefore have the yarns $B^1$ and $R^1$ of the first revolution cleared to a position below their latches, and the jackless high butt needles continue with the elastic yarn $R^1$ in back of their shanks and the body yarn $B^1$ of the first revolution in their hooks. The high butt needles with short jacks 380 differ in their action from those having long butt jacks 381 in that the elastic yarns $R^1$ and $R^2$ are behind their shanks. At the throat plate the high butt needles with jacks take the body yarn in their hooks with the elastic yarn $R^2$ present there in the case of the needles having long butt jacks 381, and at the knocking-over point the bight of body yarn $B^1$ and elastic yarn $R^1$ of the first course, which lie around the front of the shanks of the high butt needles with long butt jacks, are knocked over and off the needles and as the needles rise on the side cam 352 those bights of yarn find themselves behind the shanks. In the case of the needles with short butt jacks 380, the only bight to be thrown off is the bight of body yarn $B^1$. On the jackless high butt needles, however, the body yarn $B^1$ was not cleared below the latches and therefore remained in the hooks of those needles after the needles finished rising on the side cam 352. On the third revolution during which the needles have yarn on them, the feeding of the yarns is the same for both high butt and low butt needles, as for the high butt side on the second revolution. This is also true of the fourth revolution. On these two revolutions, on both the high butt and low butt sides, the jackless needles are not cleared. In the case of the jackless high butt needles, the body yarn $B^1$ remains on the front of the shanks, below the latches, and will be knocked off on the fifth revolution, as will be described hereinafter. In the third and fourth courses on the needles having jacks with short butts 380, loops of body yarn are drawn through the previous loops of body yarn, and on the needles having high butt jacks 381 beneath them, loops of body yarn and loops of elastic yarn are drawn through the loops of body yarn and loops of elastic yarn of the previous course. On the low butt side it is the body yarn $B^2$ of the second course which is held on the jackless needles.

On the fifth revolution the manipulation of the needles is changed. The elastic yarn ceases to be fed and the body yarn is fed to all the needles, both high butt and low butt. On the low butt side the bight of body yarn $B^2$ lying in front of the shanks of the jackless needles is cleared below the latches. At the knocking-over point these bights of the second course are knocked over the bights of body yarn of the fifth revolution which lie in the hooks of all the needles. In the case of the high butt needles, the only difference is that the bights of yarn on the jackless needles come from the body yarn of the first course rather than of the second course. Eventually the elastic yarn of the first course on the high butt side loses its loop formation and becomes straight yarn interlaced under the second and third course body yarns at the wales knit by the needles with jacks and interlaced on the other side of the fabric with the body yarn of the fifth revolution. The interlooping of the first course body yarn with the fifth course body yarn has the effect of drawing the first five courses together on the high butt needle side. The interlooping of the body yarn of the second course on the low butt side with the fifth course body yarn tends to bunch or bring together the first five courses of yarn on the low butt side. In this way a beading or edging 600 containing a plurality of elastic yarns is formed which, by virtue of its size and tension, prevents curling and produces a uniform edge and finish on the fabric.

The elastic yarn is present in every fourth course thereafter in the top, after which the thrust rod 460 rides off the high part of drum cam 502 and the finger 126 moves out of action till the next article is started. The drawdown cam 8 is also retracted by the bent lever 463 riding off of drum cam 501 and the movement of the elastic jack cam 801 is stopped by the bell crank lever 111 riding off the low end of the peripheral cam moving the pin 424 till its slot 426 is in line with the curved cam 65a.

What I claim is:

1. A plain knit stocking having a selvage top containing relatively elastic and inelastic yarns in each of a plurality of courses, recurrent loops drawing together a plurality of such courses to form a bead about the top of the stocking.

2. A plain knit stocking having a selvage top containing relatively elastic and inelastic yarns in each of a plurality of courses, recurrent loops skipping one or more of such courses to draw the courses together and form a bead about the top of the stocking.

3. A plain knit stocking having a selvage top containing relatively elastic and inelastic yarns in the first course and in each of a plurality of succeeding courses, in combination with recurrent loops drawing together a plurality of said courses to form a bead about the top of the stocking.

4. A plain knit stocking having a selvage top containing relatively elastic and inelastic yarns in each of a plurality of courses, said courses including an anti-ravel yarn containing recurrent loops drawing together a plurality of such courses to form a bead about the top of the stocking.

5. A plain knit stocking having a selvage top containing relatively elastic and inelastic yarns in each of a plurality of courses, the elastic yarn being floated recurrently over more than one wale, in combination with recurrent loops drawing together a plurality of such courses to form a bead about the top of the stocking.

6. A plain knit stocking having a selvage top containing relatively elastic and inelastic yarns in each of a plurality of courses, the elastic yarn being floated recurrently over more than one wale, said courses including an anti-ravel yarn containing recurrent loops in wales where the elastic yarn is floated, skipping one or more of such courses and drawing the courses together to form a bead about the top of the stocking.

7. In a method of making a plain knit stocking the steps of forming a selvage by floating an elastic yarn in a plurality of adjacent wales recurrently, incorporating it with inelastic yarn in every fourth wale in a plurality of courses while holding loops of inelastic yarn from at least one course in wales where the elastic yarn is floated, and subsequently knitting said loops in after one or more courses containing elastic yarn have been knit.

8. A plain knit stocking having a selvage top containing relatively elastic and inelastic yarns in the first course, the inelastic yarn being incorporated in recurrent wales only in said first course, the elastic yarn being incorporated in the first course at greater intervals than the inelastic yarn, both said yarns also being present in the second course.

9. In a method of making a selvage top on a seamless stocking, the steps of commencing feeding relatively elastic and inelastic yarns at the same point in the fabric, the inelastic yarn being incorporated in recurrent wales only in the first course, the elastic yarn being incorporated in the fabric at recurrent wales lesser in number than those to which the inelastic yarn is fed, and thereafter completing an anti-ravel construction of inelastic yarn, the elastic yarn being fed in a plurality of adjacent courses in the selvage whereby a non-curling selvage is produced.

10. In a method of making a selvage for a plain circular knit stocking, the steps of feeding elastic and inelastic yarns simultaneously for a plurality of courses, the inelastic yarn being knit in the fabric in every other wale but the elastic yarn being incorporated in the fabric at greater intervals whereby cutting of the elastic yarn is avoided.

11. In a method of making a plain knit stocking, the steps of forming a non-curling selvage comprising knitting in every other wale with inelastic yarn for a plurality of courses, thereafter forming an anti-ravel setup in all the wales from that yarn by knitting in all the wales, simultaneously incorporating elastic yarn in every fourth wale and floating it across the other three in all those courses where inelastic yarn is knit in in only every other wale, whereby an elastic selvage portion is formed above the fabric knit in every wale.

12. In a method of making a plain knit stocking, the steps of forming a non-curling selvage comprising knitting with inelastic yarn in some wales and not knitting in recurrent wales while simultaneously floating an elastic yarn across a plurality of adjacent wales recurrently and incorporating it with the inelastic yarn in the fabric in other wales less in number than the wales in which the inelastic yarn is knit, continuing this for a plurality of courses including the first course and subsequently knitting with the inelastic yarn alone in all the wales, whereby a selvage portion containing elastic in a plurality of courses is formed above the point where the fabric knit in every wale begins.

13. A plain knit stocking having a selvage top containing relatively elastic and inelastic yarns in each of a plurality of successive courses including the first course, the inelastic yarn being incorporated in recurrent wales only in said plurality of courses, the elastic yarn being incorporated in the fabric in said courses at greater intervals than the inelastic yarn, whereby a non-curling selvage is produced.

14. A plain knit stocking having a selvage top containing relatively elastic and inelastic yarns in each of a plurality of successive courses including the first course, the elastic yarn being incorporated in the fabric in not more than one-third of the wales and the inelastic yarn being knit recurrently in the first two courses in less than the full number of wales whereby a non-curling selvage is produced.

15. A plain knit stocking having a selvage top containing relatively elastic and inelastic yarns in the first course, the elastic yarn being present in each of a plurality of successive courses, the inelastic yarn being knit into stitches in the first two courses in not more than half the wales of the stocking, the elastic yarn being incorporated in the fabric in said courses at recurrent wales lesser in number than those in which the inelastic yarn is incorporated in said courses.

16. A plain knit stocking having a selvage containing elastic and inelastic yarns in each of a plurality of successive courses including the first course, the inelastic yarn in a plurality of the first courses of the selvage being knit in only every other wale of the succeeding courses and the elastic yarn in those courses being knit in the fabric in only every fourth wale, whereby the selvage is made non-curling.

17. A plain knit stocking having a selvage containing elastic and inelastic yarn in each of a plurality of successive courses including the first course, the inelastic yarn not having a stitch in every wale until after a plurality of courses, and the elastic yarn being incorporated in the fabric in that plurality of courses in recurrent wales spaced at greater distances than the stitches of inelastic yarn in those courses, whereby a non-curling selvage is formed.

18. A plain knit stocking having a selvage containing elastic and inelastic yarns in each of a plurality of successive courses including the first course, the inelastic yarn being knit in every other wale in a plurality of successive courses including the first, while the elastic yarn in those courses is incorporated in the fabric of every fourth wale, in combination with courses below said successive courses containing inelastic yarn knit in every wale, whereby a non-curling elastic structure is formed above the courses where stitches of inelastic yarn are present in every wale.

WALTER WILLIAM SCHOLZ.